Jan. 21, 1969   A. V. NEY   3,422,852
FLUID TYPE VALVE
Filed Oct. 11, 1966   Sheet 1 of 3
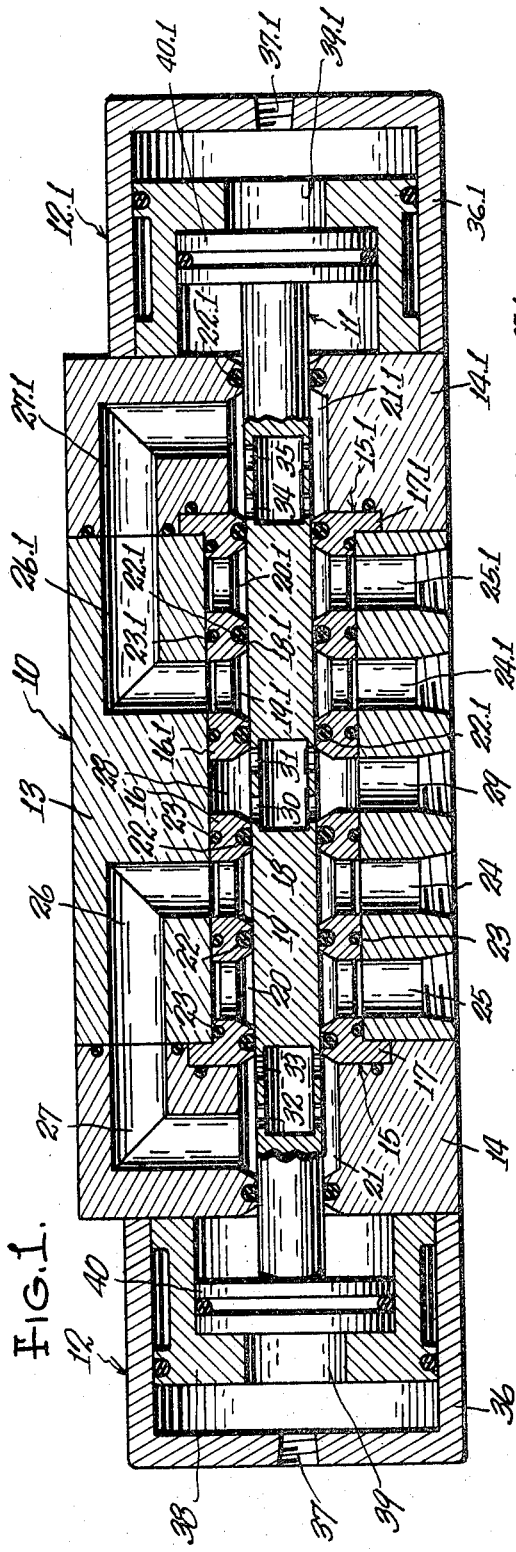
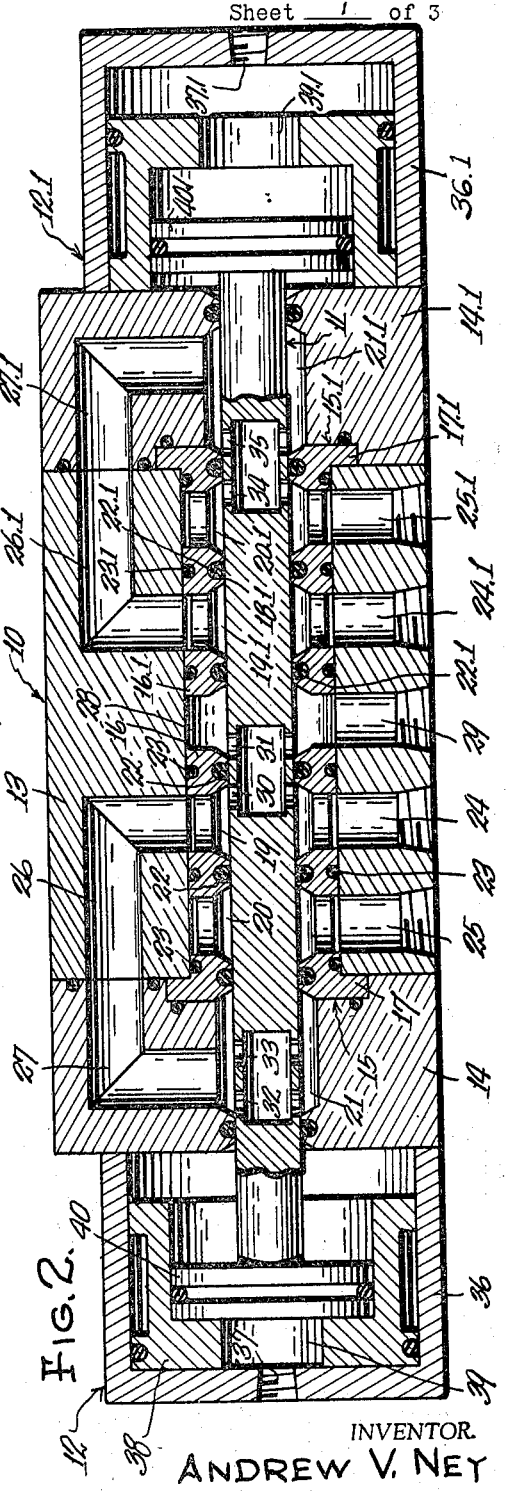
INVENTOR.
ANDREW V. NEY
BY Williams and Kreske
ATTORNEYS

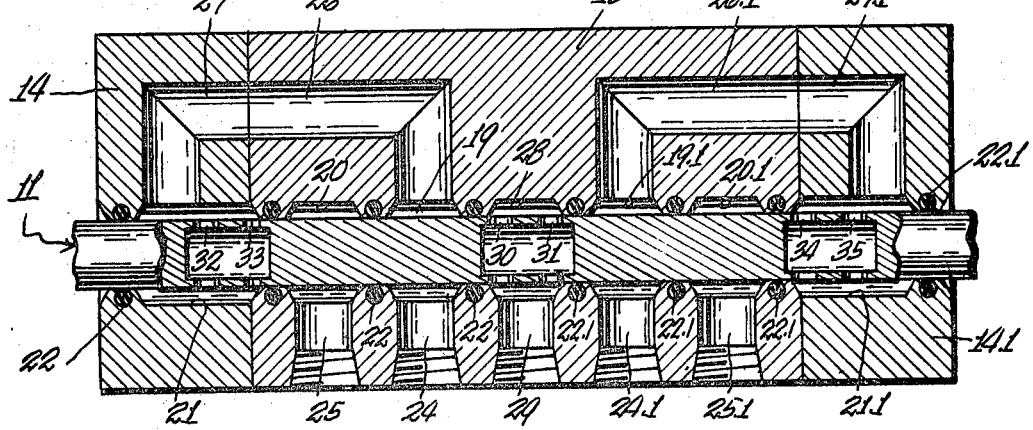
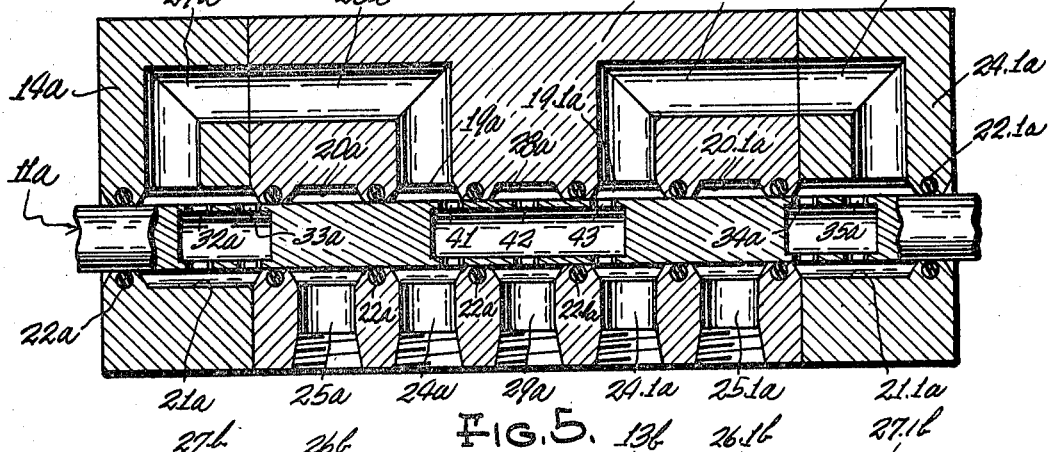
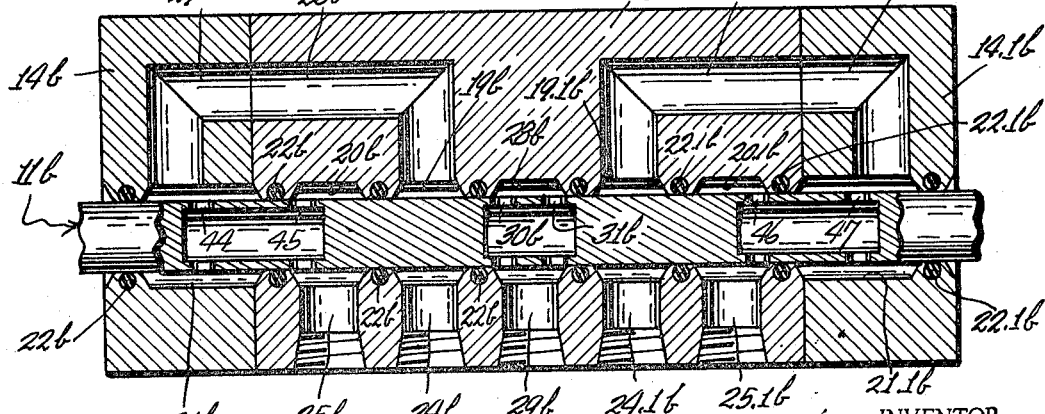

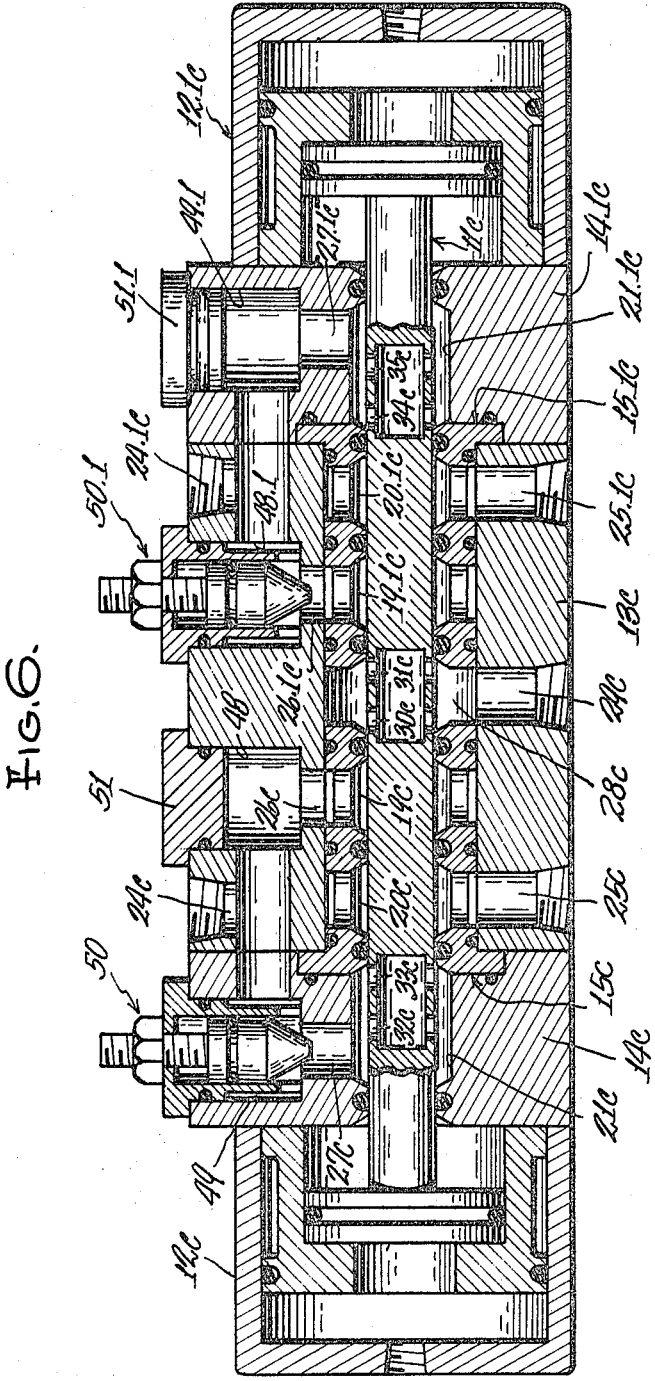

United States Patent Office 3,422,852
Patented Jan. 21, 1969

3,422,852
FLUID TYPE VALVE
Andrew V. Ney, Alliance, Ohio, assignor to
Salem Valve Company, Salem, Ohio
Filed Oct. 11, 1966, Ser. No. 585,845
U.S. Cl. 137—625.69          8 Claims
Int. Cl. F16k 11/07

ABSTRACT OF THE DISCLOSURE

A fluid control valve having a plurality of fluid chambers in spaced-apart relation and through which a plunger passes and is reciprocable between various positions. Flexible seals encircle the plunger and are disposed between the chambers to seal them from each other. Ports are provided in the plunger periphery to provide for selective flow of fluid between certain chambers while the latter and the plunger porting are so arranged that during plunger movement between its various positions, the plunger ports at all times move into a chamber having a pressure lower than or equal to the pressure to which they were previously subjected.

---

The present invention relates to fluid valves, more particularly to valves of the plunger type, and the principal object of the invention is to provide new and improved values of such character.

Plunger type valves have achieved wide usage since they are capable of sealing high pressures, they lend themselves well to modulating fluid flow, require relatively little operating force which is virtually independent of the pressure of the fluid being controlled, and perhaps most important, the normal wearing parts of the valve are flexible, annular sealing members engaged with the plunger periphery which can readily be replaced when necessitated by wear.

Plunger type valves normally comprise a valve body in which a plunger is reciprocable, the plunger intersecting at least two chambers formed in the valve body, and flexible, annular sealing members on each side of the chambers and closely engaging the plunger periphery to prevent movement of fluid therealong. In order to selectively provide for fluid flow between chambers, the plunger is provided with port means at its periphery which may be shifted from one side to the other of a sealing member upon plunger reciprocation.

It has long been recognized that if a plunger port aforesaid passes from a relatively low pressure area on one side of a sealing member to a relatively high pressure area on the other side of such member, there will be a tendency to extrude the sealing member into the plunger port thus resulting in sealing member damage. Indeed, in an improperly designed valve and when very high pressure fluid is being controlled by the valve, a single shift of the plunger can destroy a sealing member and render the valve useless until repaired.

Heretofore, single plunger valves have been provided which, in normal operation, plunger reciprocation causes its ports to pass a sealing member and into an area of equal or lower pressure thus obviating sealing member damage. However, the prior art has failed to provide this principle of operation, hereinafter to be referred to as the floating seal principle, to a single-plunger, three-position, four-way valve.

The present invention provides a single-plunger, three-position, four-way valve having the floating seal principle for long, trouble-free life. This and other advantages will readily become apparent from a study of the following description and from the drawings appended hereto, and in these drawings:

FIGURE 1 is a view in longitudinal section through a valve embodying the present invention, FIGURE 2 is a view similar to FIGURE 1 but showing the valve operating parts in a different position.

FIGURE 3 is a view similar to FIGURE 1 but showing the valve in simplified form and omitting the actuating mechanism, FIGURE 4 is a view similar to FIGURE 3 but showing how the use of a different plunger changes the valve function when the plunger is in centered position, FIGURE 5 is a view similar to FIGURE 4 but showing how the valve function is changed when still another valve plunger is used, and FIGURE 6 is a view similar to FIGURE 1 but showing a modified structure which selectively incorporates integral, flow control devices for limiting the flow of fluid through the valve and thus the speed of apparatus controlled thereby.

With reference to FIGURE 1, there is illustrated a four-way fluid control valve having a housing 10 in which a single plunger 11 is reciprocable. Fluid pressure actuating means 12, 12.1 are disposed at respective ends of the valve housing 10 for effecting axial movement of the plunger 11 as will later be disclosed. As herein shown and for reasons to appear, housing 10 is preferably formed of a main housing portion 13 and housing end portions 14, 14.1 removably secured in any suitable manner to respective ends of the main housing. For manufacturing simplicity and to obviate the necessity of replacing the main housing in the event of severe wear of the operating parts, plunger 11 is not slidable directly therein but instead is slidable in respective sleeves 15, 15.1 removably disposed in a bore in the housing main portion 13.

Sleeve 15 has a shank portion 16 closely fitting within the bore of housing 13, a flanged portion 17 bearing against the end of housing 13, and a bore 18 for closely but slidably receiving the plunger 11. For reasons to appear, sleeve bore 18 has axially spaced, radial enlargements providing respective chambers 19 and 20. A similar although elongated radial enlargement is formed in the housing end 14 to provide a chamber 21, such housing end serving to retain the sleeve 15 in position and, of course, being apertured to closely but slidably receive the plunger 11. Suitable annular sealing members, such as O sealing rings 22 are carried by the sleeve 15 and the housing end 14 for sealably engaging the plunger to close the chambers 19, 20 and 21 off from each other. Also, carried by the sleeve 15 are O sealing rings 23 which establish a fluid-tight seal between the sleeve and the housing bore in which the sleeve is disposed.

Formed in the main housing 13 are fluid passages 24, 25 whose mouths may be internally threaded to provide for connection of suitable piping thereto. Passage 24 is in communication with the chamber 19 via transverse openings formed in the sleeve 15 while passage 25 is similarly in communication with the chamber 20. Also formed in the main housing 13 is a passage 26 which aligns with a passage 27 formed in the housing end 14. Passage 26 is in communication with the chamber 19 while the passage 27 is in communication with the chamber 21, such passages cooperating, of course, to establish continuous communication between the chambers 19, 21.

Turning now to the opposite end of the valve, it is to be understood that the sleeve 15.1 and the housing end 14.1 are identical to the corresponding parts previously described. Accordingly, corresponding parts, passages, chambers, and the like are identified by the same reference characters but with the suffix ".1" added.

It is to be noted that the inner ends of the sleeves 15, 15.1 are axially spaced from each other to combine with the bore of housing 13 in providing a chamber 28 between the chambers 19, 19.1. A passage 29, similar to passages 24, 25, 24.1, 25.1, is in communication with the chamber 28.

In order to selectively establish communication between certain of the previously mentioned chambers, plunger 11 is provided with a central set of peripherally disposed, axially spaced ports 30, 31 in communication with each other via hollow in the plunger, an end set of similar intercommunicating ports 32, 33, and an opposite end set of ports 34, 35. While individual plunger ports are herein shown, it will be evident that an elongated slot in the plunger periphery could as well be substituted therefor.

Turning now to the plunger actuating means 12, 12.1, only means 12 need be described in detail since means 12.1 is identical thereto and its various parts are identified by the same reference characters but with the suffix .1 added. Means 12 comprises a cup-shaped cylinder 36 suitably secured to the housing end 14 and having a port 37 through which fluid under pressure may be admitted and discharged. Slidable in cylinder 36 is a cup-shaped outer piston 38 having a central opening 39. Slidable within outer piston 38 is an inner piston 40 to which abuts the adjoining end of the plunger 11. Suitable sealing members, such as the O rings herein illustrated, may be employed to effect a fluid-tight seal between the inner and outer pistons and between the latter and the cylinder 36.

Normally, the same fluid pressure will be maintained in the cylinders 36, 36.1 thus disposing the parts in the centered position seen in FIGURE 1. If, however, fluid pressure is exhausted from the cylinder 36, pressure in cylinder 36.1 will act against the inner piston 40.1 and force it to the left. As piston 40.1 moves to the left, it will push plunger 11 and pistons 38 and 40 to the positions seen in FIGURE 2. If, fluid pressure is now re-admitted to cylinder 36, such pressure will act against the combined areas of pistons 38 and 40 and, being opposed only by the pressure acting against the smaller area of the piston 40.1, will return the parts to the centered position of FIGURE 1. On the other hand, if pressure is exhausted from cylinder 36.1, the parts will be shifted to the right from the position seen in FIGURE 1, by the pressure in cylinder 36. Re-establishment of fluid pressure in cylinder 36.1 will, of course, return the parts to the position of FIGURE 1 once again.

With the plunger 11 in the centered position of FIGURE 1, it will be noted that the plunger ports 30, 31 are both within the chamber 28, the ports 32, 33 are both within the chamber 21, while the ports 34, 35 are both within the chamber 21.1. Assuming that passage 29 is connected to a source of fluid pressure, that passages 24, 24.1 are connected to respective ends of a fluid power cylinder (not shown) or other device to be operated, and that passages 25, 25.1 are connected to return exhausted fluid to its source, or to the atmosphere if the fluid being controlled is air, it will be seen that fluid pressure will be trapped within the chamber 28 (hereinafter referred to as the inlet chamber), while fluid will be trapped within the interconnected chambers 19, 21 and 19.1 and 21.1 (hereinafter referred to as inboard and outboard fluid outlet chambers, respectively), and isolated from the chambers 20, 20.1 (hereinafter referred to as exhaust chambers).

If the plunger 11 is now shifted in the manner previously described to the position seen in FIGURE 2, the plunger ports 32, 33 will merely be shifted within the outboard outlet chamber 21 but will not establish a flow path. Plunger port 30, however, will now be disposed within the inboard outlet chamber 19 while port 31 remains in the inlet chamber 28, to thus allow fluid pressure to flow out of the passage 24. Similarly, plunger port 34 will now be disposed in the exhaust chamber 20.1, while port 35 remains in the outboard outlet chamber 21.1, to thus exhaust fluid pressure in the passage 24.1. Upon return of the plunger 11 to the position of FIGURE 1, pressure at the passage 24 and in the inboard and outboard outlet passage 19, 21 respectively, will be trapped therein as previously pointed out.

It is an important feature of the present invention that since fluid pressure in the inboard outlet chamber 19 cannot, in ordinary circumstances, ever rise above inlet fluid pressure, passage of the plunger port 30 beneath the adjoining O ring seal 22, in either direction of plunger movement, cannot damage such seal. This results because plunger port 30 is always exposed to inlet fluid pressure via the port 31 in the inlet chamber 28 and the interconnecting plunger cavity and therefore there will be no tendency for the sealing member to be forced by fluid pressure into the port 30 as it passes thereunder.

With fluid pressure trapped within the inboard outlet chamber 19, the same pressure also existing in the outboard outlet chamber 21 because of interconnecting conduits 26, 27, it will next be assumed that the plunger 11 will be shifted to the right from the position seen in FIGURE 1. In this direction of plunger movement, the plunger ports 34, 35 will remain within chamber 21.1 and thus have no effect on fluid flow. Such plunger movement, however, will dispose the plunger port 33 in the exhaust chamber 20 while the port 32 remains in the outboard outlet chamber 21 to thus exhaust fluid pressure from the passage 24. In moving past the seal 22, the plunger port 33 will not damage the latter since the pressure at such port will always be equal to, or greater (but never less than) the pressure in the exhaust chamber. Finally movement of plunger 11 to the right will dispose the plunger port 31 in the inboard oulet chamber 19.1 while the plunger port 30 remains in the inlet chamber 28. Here again, seal damage cannot result as the port 31 passes beneath the seal 22.1 for the same reasons heretofore pointed out with respect to the plunger movement to the left to the position of FIGURE 2.

From the foregoing, it will be apparent that regardless of how quickly the plunger 11 is shifted or in which direction, the seals cannot be damaged by passage of a plunger port therebeneath since no plunger port ever moves past a seal and into a chamber having a higher pressure than that existing at such port.

Turning now to FIGURE 3, the construction therein shown is identical to that disclosed in FIGURE 1 and thus the parts are identified by the same reference characters. The construction of FIGURE 3, however, omits the plunger actuating mechanism and the sleeves in which the plunger is reciprocated in the interest of simplicity.

In the construction thus far disclosed and in the centered position of the plunger, flow of inlet fluid pressure to the outlet passages 24, 24.1 is blocked as is flow of fluid from such passages to exhaust. Under certain circumstances, however, it may be desired to pressurize both outlet passages 24, 24.1 or to exhaust such passages when the plunger is in centered position. This may readily be effectuated, as will hereinafter be disclosed, merely by replacing the plunger 11 with one having a different porting arrangement.

As viewed in FIGURE 4 wherein like parts are identified with the same reference characters as before but with the suffix *a* added, the structure is identical with that shown in FIGURE 3 with the exception of the plunger 11*a*. In this embodiment and with the plunger 11*a* in its centered position illustrated, a port 41 thereof is disposed in the inboard outlet chamber 19*a*, a port 42 is disposed in the inlet chamber 28*a* and a port 43 is disposed in the inboard outlet chamber 19.1*a*. Since the ports aforesaid are interconnected by a plunger hollow, inlet pressure is continually fed to the outlet passages 24*a*, 24.1*a* when the plunger is in centered position.

If the plunger 11*a* is now shifted to the left to a position corresponding to that shown in FIGURE 2, plunger ports 32*a*, 33*a* will remain in their outboard outlet chamber 21a. Plunger port 35a will remain in its outboard outlet chamber 21.1a; however, port 34a will be disposed in the exhaust chamber 20.1a to thus exhaust the fluid at the outlet passage 24.1a. At the same time, plunger port 41 will remain in the inboard outlet chamber 19a while port 43 will be withdrawn from its inboard outlet chamber 19.1a and disposed in the inlet chamber 28a. Accordingly, with plunger 11a shifted to the left, outlet passage 24a will remain pressurized while outlet passage 24.1a will be exhausted. Upon return of the plunger 11a to its centered position shown, both of outlet passages 24a, 24.1a will again be pressurized. If the plunger 11a is shifted from its centered position to the right rather than to the left, it will readily be apparent that the outlet passage 24.1a will remain pressurized while the outlet passage 24a will be exhausted.

In the embodiment of FIGURE 5 wherein corresponding parts are identified by the same reference characters as before but with the suffix b added, and with the plunger 11b in its illustrated centered position, a port 44 thereof is disposed in the outboard outlet chamber 21b while a port 45 is disposed in the exhaust chamber 20b. Ports 44, 45 are, of course, interconnected by a plunger hollow so as to establish continuous communication between the outlet passage 24b and the exhaust passage 25b with the plunger centered. In a similar manner a plunger port 46 is disposed in the exhaust chamber 20.1b while a port 47 is disposed in the outboard outlet chamber 21.1b to continuously exhaust the outlet passage 24.1b with the plunger centered.

If the plunger 11b is now shifted to the left, the plunger ports 46, 47 will remain in respective exhaust and outlet chambers 20.1b, 21.1b. Plunger port 44 will remain in its outboard outlet chamber 21b; however, port 45 will be withdrawn from its exhaust chamber 20b and disposed in the chamber 21b to thus interrupt communication between the exhaust chamber 20b and the outlet passage 24b. At the same time, plunger port 31b will remain in the inlet chamber 28b while the port 30b will be disposed in the inboard outlet chamber 19b. Accordingly, with the plunger 11b shifted to the left, outlet passage 24.1b will continue to be exhausted while outlet passage 24b will be pressurized. If plunger 11b is shifted to the right from its centered position rather than to the left, it will be evident that outlet passage 24b will continue to be exhausted while outlet passage 24.1b will be pressurized.

Although not previously mentioned, it is to be understood that the plungers 11a and 11b have in common with plunger 11 the advantage that in passing beneath the seals, none of the plunger ports will cause seal damage for the reasons detailed in the description of FIGURES 1 and 2.

The embodiment of FIGURE 6 is similar to that of FIGURE 1 and therefore corresponding parts are identified by the same reference characters but with the suffix c added. In this embodiment, the previously disclosed outlet passages in the lower portion of the main housing have been eliminated and such outlet passages have instead been formed in the upper portion of the main housing and in communication with respective conduits 26c, 26.1c. Additionally, bores 48, 49 are formed in the main housing 13c and the end housing 14c respectively, the bore 48 being interposed in the conduit 26c and the bore 49 being interposed in the conduit 27c. Similarly, bores 48.1, 49.1 are formed in the main housing 13c and the end housing 14.1c respectively, the bore 48.1 being interposed in the conduit 26.1c and the bore 49.1 being interposed in the conduit 27.1c. As herein disclosed, an adjustable flow control device 50 is disposed in the bore 49 while an identical device 50.1 is disposed in the bore 48.1. The open ends of bores 48, 49.1 are herein shown closed by respective caps 51. 51.1.

In operation of the embodiment seen in FIGURE 6, fluid flow from the inlet passage 29c to the outlet passage 24c upon plunger movement to the left from its centered position shown will be unimpeded since there is no flow control device in bore 48. Similarly, fluid flow from the outlet passage 24.1c and to the exhaust passage 25.1c will also be unimpeded because of the absence of a flow control device in the bore 49.1. On the other hand, fluid flow from the outlet passage 24c to the exhaust passage 25c upon plunger movement to the right from its centered position will be impeded by the flow control device 50 in bore 49. Similarly, fluid flow from the inlet passage 29c to the outlet passage 24.1c will be impeded by the flow control device 50.1 in the bore 48.1.

While flow control devices have been shown in both bores 49, 48.1 while bores 48, 49.1 are capped, it is to be understood that flow control devices may, if required, be disposed in each of the bores 48, 49, 48.1 and 49.1 by removing the caps 51, 51.1, all flow control devices may be omitted by capping each bore, or any combination of flow control devices and caps may be disposed in such bores.

While the valves herein illustrated have been disclosed as having a central inlet chamber with inboard and outboard outlet chambers on each side thereof and with an exhaust chamber between each of the inboard and outboard outlet chambers, it is to be understood that the invention contemplates interchanging the function of the inlet and exhaust chambers. In other words, the central inlet chamber may be employed as an exhaust chamber while the pair of exhaust chambers may be employed as respective inlet chambers without departing from the spirit of the invention.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:
1. A fluid control valve comprising a housing providing a pair of spaced-apart, outboard fluid outlet chambers,
 a fluid inlet chamber intermediate said outboard outlet chambers,
 a pair of inboard fluid outlet chambers adjacent said fluid inlet chamber and the chambers of such pair being disposed intermediate said inlet chamber and respective outboard outlet chambers aforesaid,
 a pair of exhaust chambers one of which is disposed intermediate said inboard and outboard outlet chambers on one side of said inlet chamber and the other of which is disposed intermediate said inboard and outboard outlet chambers on the other side of said inlet chamber,
 an elongated plunger reciprocable within said housing and having inner port means intermediate its ends for selectively establishing and interrupting communication between said inlet chamber and respective inboard fluid outlet chambers aforesaid and having outer port means adjacent respective ends thereof, one of said outer plunger port means selectively establishing and interrupting communication between the outboard fluid outlet chamber on one side of said inlet chamber and its adjoining exhaust chamber and the other of said outer plunger port means selectively establishing and interrupting communication between the outboard fluid outlet chamber on the other side of said inlet chamber and its adjoining exhaust chamber,
 said inner plunger port means, in a centered position of said plunger, being disposed wholly within said inner fluid inlet chamber and, in such plunger centered position, said outer plunger port means being disposed wholly within respective outboard fluid outlet chambers aforesaid, in another position of said plunger, said inner plunger port means being in part disposed in said fluid inlet chamber and in part disposed in the inboard fluid outlet chamber on one side of said inlet chamber and in such other plunger position, one of said outer plunger port means being in part disposed in the outboard fluid outlet chamber on the other side of said fluid inlet chamber and in part disposed in its adjoining exhaust chamber, annular sealing means between the chambers aforesaid and having fluid-sealing engagement with the periphery of said plunger, and conduit means establishing continuous communication between said inboard and outboard fluid outlet chambers on one side of said fluid inlet chamber and between said inboard and outboard fluid outlet chambers on the other side of said fluid inlet chamber.

2. A fluid control valve comprising a housing providing a pair of spaced-apart, outboard fluid outlet chambers, a fluid inlet chamber intermediate said outboard outlet chambers, a pair of inboard fluid outlet chambers adjacent said fluid inlet chamber and the chambers of such pair being disposed intermediate said inlet chamber and respective outboard outlet chambers aforesaid, a pair of exhaust chambers one of which is disposed intermediate said inboard and outboard outlet chambers on one side of said inlet chamber and the other of which is disposed intermediate said inboard and outboard outlet chambers on the other side of said inlet chamber, an elongated plunger reciprocable within said housing and having inner port means intermediate its ends for selectively establishing and interrupting communication between said inlet chamber and respective inboard fluid outlet chambers aforesaid and having outer port means adjacent respective ends thereof, one of said outer plunger port means selectively establishing and interrupting communication between the outboard fluid outlet chamber on one side of said inlet chamber and its adjoining exhaust chamber and the other of said outer plunger port means selectively establishing and interrupting communication between the outboard fluid outlet chamber on the other side of said inlet chamber and its adjoining exhaust chamber, said inner plunger port means, in a centered position of said plunger, being in part disposed in said fluid inlet chamber and in part disposed in both of said inboard fluid outlet chambers and in such plunger centered position, said outer plunger port means, being disposed wholly within respective outboard fluid outlet chambers aforesaid, in another position of said plunger, said inner plunger port means being withdrawn from the inboard fluid outlet chamber on one side of said fluid inlet chamber and in such other plunger position, one of said outer plunger port means being in part disposed in said outboard fluid outlet chamber on said inlet fluid inlet chamber one side and in part disposed in its adjoining exhaust chamber, annular sealing means between the chambers aforesaid and having fluid-sealing engagement with the periphery of said plunger, and conduit means establishing continuous communication between said inboard and outboard fluid outlet chambers on one side of said fluid inlet chamber and between said inboard and outboard fluid outlet chambers on the other side of said fluid inlet chamber.

3. A fluid control valve comprising a housing providing a pair of spaced-apart, outboard fluid outlet chambers, a fluid inlet chamber intermediate said outboard outlet chambers, a pair of inboard fluid outlet chambers adjacent said fluid inlet chamber and the chambers of such pair being disposed intermediate said inlet chamber and respective outboard outlet chambers aforesaid, a pair of exhaust chambers one of which is disposed intermediate said inboard and outboard outlet chambers on one side of said inlet chamber and the other of which is disposed intermediate said inboard and outboard outlet chambers on the other side of said inlet chamber, an elongated plunger reciprocable within said housing and having inner port means intermediate its ends for selectively establishing and interrupting communication between said inlet chamber and respective inboard fluid outlet chambers aforesaid and having outer port means adjacent respective ends thereof, one of said outer plunger port means selectively establishing and interrupting communication between the outboard fluid outlet chamber on one side of said inlet chamber and its adjoining exhaust chamber and the other of said outer plunger port means selectively establishing and interrupting communication between the outboard fluid outlet chamber on the other side of said inlet chamber and its adjoining exhaust chamber, said inner plunger port means, in a centered position of said plunger, being disposed wholly within said fluid inlet chamber and, in such plunger centered position, one of said outer plunger port means being in part disposed in an outboard fluid outlet chamber on one side of said fluid inlet chamber and in part disposed in its adjoining fluid exhaust chamber, said other outer plunger port means, in such plunger centered position, being in part disposed in the outboard fluid outlet chamber on the other side of said inlet chamber and in part disposed in its adjoining fluid exhaust chamber, in another position of said plunger, said inner plunger port means being in part disposed in said fluid inlet chamber and in part disposed in the inboard fluid outlet chamber on one side of said inlet chamber and, in such other plunger position, one of said outer plunger port means being disposed wholly within said outboard fluid outlet chamber on said inlet chamber one side, annular sealing means between the chambers aforesaid and having fluid-sealing engagement with the periphery of said plunger, and conduit means establishing continuous communication between said inboard and outboard fluid outlet chambers on one side of said fluid inlet chamber and between said inboard and outboard fluid outlet chambers on the other side of said fluid inlet chamber.

4. A fluid control valve comprising a housing providing a pair of spaced-apart, fluid outlet chambers, a fluid inlet chamber and a fluid exhaust chamber within said housing and one being interposed between said outlet chambers, an elongated plunger reciprocable within said housing and intersecting each of said chambers, said plunger having a first port means for selectively establishing and interrupting communication between said inlet chamber and one of said outlet chambers, said first port means, in all normal operating position of said plunger, at least in part being disposed in said inlet chamber, said plunger also having a second port means for selectively establishing and interrupting communication between said fluid exhaust chamber and one of said outlet chambers, said second port means, in all normal operating positions of said plunger, at least in part being disposed in one of said outlet chambers, annular sealing means between the chambers aforesaid and having fluid-sealing engagement with the periphery of said plunger, conduit means in part formed in said valve housing and establishing continuous communication between said outlet chambers, said conduit means having a first portion providing for fluid flow outwardly of said valve from one of said outlet chambers and a second portion providing for fluid flow inwardly of said valve into one of said outlet chambers, and flow control means interposed in one of said conduit means portions to restrict fluid flow therethrough without affecting fluid flow through the other of said conduit means portions.

5. A fluid control valve comprising a main housing portion having respective opposed end portions removably secured thereto and said housing end portions each at least in part providing an outboard fluid outlet chamber, said main housing portion providing a first chamber intermediate said outboard fluid outlet chambers and selectively functioning as a fluid inlet chamber and a fluid exhaust chamber, a pair of inboard fluid outlet chambers in said main housing portion adjacent said first chamber and the chambers of such pair being disposed intermediate said first chamber and respective outboard outlet chambers aforesaid, a pair of second chambers in said main housing portion and selectively functioning as fluid exhaust chambers and fluid inlet chambers, one of said second chambers being disposed intermediate said inboard and outboard outlet chambers on one side of said first chamber and the other being disposed intermediate said inboard and outboard outlet chambers on the other side of said first chamber, an elongated plunger reciprocable within said housing portions and intersecting each of said chambers, said plunger having peripherally disposed port means through which communication between certain of said chambers is selectively established, annular sealing means between the chambers aforesaid and having fluid sealing engagement with the periphery of said plunger, and conduit means establishing continuous communication between said inboard and outboard fluid outlet chambers on the one side of said first chamber and between said inboard and outboard fluid outlet chambers on the other side of said first chamber.

6. The construction of claim 5 wherein said conduit means are in part provided by said main housing portion and in part provided by respective housing end portions.

7. The construction of claim 6 wherein said housing main portion provides an elongated bore in which said plunger is reciprocable, wherein a pair of sleeves are closely received in respective ends of said bore and in turn slidably receive said plunger, wherein said inlet, exhaust and inboard fluid outlet chambers are at least in part provided by said pair of sleeves, and wherein said housing end portions bear against respective adjoining sleeves to retain the latter in position in said bore.

8. A fluid control valve comprising a valve housing in which any one of three elongated valve plungers are selectively receivable, said valve housing providing a pair of spaced-apart, outboard fluid outlet chambers, an inlet chamber intermediate said outboard outlet chambers, a pair of inboard fluid outlet chambers adjacent said fluid inlet chamber and the chambers of such pair being disposed intermediate said inlet chamber and respective outboard fluid outlet chambers aforesaid, a pair of fluid exhaust chambers one of which is disposed intermediate said inboard and outboard outlet chambers on one side of said inlet chamber and the other of which is disposed intermediate said inboard and outboard outlet chambers on the other side of said inlet chamber, said housing providing an elongated bore in which respective valve plungers are closely received for reciprocation between a centered position and extreme positions on opposite sides of said centered position to establish and interrupt communication between certain of said chambers, annular sealing means between the chambers aforesaid and having fluid-sealing engagement with respective valve plungers, conduit means formed in said housing and establishing continuous communication between said inboard and outboard fluid outlet chambers on one side of said inlet chamber and between said inboard and outboard fluid outlet chambers on the other side of said inlet chamber, one of said plungers having peripherally disposed port means at an intermediate portion thereof which, in the centered position of such plunger, are disposed wholly within said inlet chamber and having peripherally disposed port means adjacent respective ends thereof which, in such plunger centered position, are disposed wholly within respective outboard fluid outlet chambers, another of said plungers having peripherally disposed port means at an intermediate portion thereof which, in the centered position of said plunger, are disposed in part within said fluid inlet chamber and in part disposed within respective inboard fluid outlet chambers and having peripherally disposed port means adjacent respective ends thereof which, in such plunger centered position, are disposed wholly within respective outboard fluid outlet chambers, and still another of said plungers having peripherally disposed port means at an intermediate portion thereof which, in the centered position of such plunger, are disposed wholly within said inlet chamber and having peripherally disposed port means adajcent respective ends thereof which, in such plunger centered position, are in part disposed in respective outboard fluid outlet chambers and in part disposed in respective adjoining fluid exhaust chambers, said plungers being selectively usable with said housing and in plunger centered position, said one plunger interrupting communication between said inlet chamber and all of said outlet chambers and interrupting communication between all of said outlet chambers and said exhaust chambers, said other plunger establishing communication between said inlet chamber and respective inboard fluid outlet chambers and interrupting communication between all of said outlet chambers and said exhaust chambers, and said still another plunger interrupting communication between said inlet chamber and all of said outlet chambers and establishing communication between said outboard fluid outlet chambers and respective adjoining fluid exhaust chambers.

References Cited

UNITED STATES PATENTS

| 2,910,050 | 10/1959 | Dotter et al. | 137—625.68 XR |
| 3,076,476 | 2/1963 | Campbell | 137—625.68 |
| 3,270,774 | 9/1966 | Stuart | 137—596.18 |
| 3,364,943 | 1/1968 | Keller | 137—596.18 |

DANIEL BLUM, Primary Examiner.

U.S. Cl. X.R.

137—625.66